US008700318B2

(12) United States Patent
Tan

(10) Patent No.: US 8,700,318 B2
(45) Date of Patent: Apr. 15, 2014

(54) SYSTEM AND METHOD FOR SELECTIVE CANCELLATION OF NAVIGATION LOCKOUT

(75) Inventor: Adrian K. Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 576 days.

(21) Appl. No.: 12/720,938

(22) Filed: Mar. 10, 2010

(65) Prior Publication Data
US 2011/0224897 A1 Sep. 15, 2011

(51) Int. Cl.
G01C 21/00 (2006.01)
G01C 21/36 (2006.01)

(52) U.S. Cl.
CPC .................... G01C 21/36 (2013.01)
USPC .............. 701/432; 701/400; 455/456.4

(58) Field of Classification Search
CPC ........................................ G01C 21/36
USPC ................... 701/200, 432; 455/456.4
See application file for complete search history.

(56) References Cited

U.S. PATENT DOCUMENTS 5,745,030 A * 4/1998 Aaron .................. 340/426.11
6,591,168 B2 7/2003 Odinak et al.
7,873,374 B1 * 1/2011 O'Neil .................. 455/456.4
2005/0073195 A1 * 4/2005 Popilek .................. 307/10.1
2005/0280524 A1 * 12/2005 Boone et al. ............ 340/461
2007/0182721 A1 * 8/2007 Watanabe et al. ............ 345/173
2007/0262953 A1 11/2007 Zackschewski
2008/0106595 A1 5/2008 Yamane et al.
2008/0186282 A1 8/2008 Nix et al.
2009/0055180 A1 2/2009 Coon et al.
2009/0082951 A1 * 3/2009 Graessley .................. 701/200
2011/0021213 A1 * 1/2011 Carr .................... 455/456.4

* cited by examiner

Primary Examiner — Ryan Zeender
Assistant Examiner — Hunter Wilder
(74) Attorney, Agent, or Firm — Young, Basile, Hanlon & MacFarlane, P.C.

(57) ABSTRACT

Disclosed herein is a navigation system for a vehicle. The navigation system includes a user interface configured to receive input from and output information to a user, and a controller configured to perform a plurality of functions based on the user input, the controller further configured to disable performance of at least one of the plurality of functions based on a vehicle condition and provide a warning to the user indicating that performance of the plurality of functions is to be performed by a passenger other than a driver, wherein the controller enables performance of the at least one of the plurality of functions upon receiving input signifying that the user is a passenger other than the driver.

11 Claims, 4 Drawing Sheets

SYSTEM AND METHOD FOR SELECTIVE CANCELLATION OF NAVIGATION LOCKOUT

FIELD OF THE INVENTION

The present invention generally pertains to systems and methods of selective cancellation of navigation lockout and more specifically selective cancellation of navigation lockout based on input received signifying a user is a passenger.

BACKGROUND

Some vehicles include electronic vehicle navigation systems. These systems can be integrated into the vehicle interior and electronically interconnected to, for example, the vehicle's power system, speedometer and other sensory devices. Commonly, these systems also utilize global positioning signals (GPS) received from orbiting satellites or other vehicle location sensing systems to determine the geographic location of the vehicle and to assist the user in navigating of the vehicle. These systems typically allow inputs from the user, for example to select a destination, and the navigation system can output directions or other instructions through visual and/or audio displays to guide the user from their current location to the desired location.

Many drivers talk on cellular phones, adjust the volume of sound systems, view emails or other messages on one or more personal electronic devices or adjust settings of navigation systems while driving. Some vehicle navigation systems, for example, have fully or partially restricted the use of functions while the vehicle is in motion. However, restricting the use of functions may be inconvenient to the driver and other occupants in the vehicle.

SUMMARY

Embodiments of a navigation system are disclosed herein. In one such embodiment, the navigation system includes a user interface and a controller. The user interface is configured to receive input from and output information to a user. The controller is configured to perform a plurality of functions based on the user input. The controller is further configured to disable performance of at least one of the plurality of functions based on a vehicle condition and provide a warning to the user indicating that performance of the plurality of functions is to be performed by a passenger other than a driver. The controller enables performance of the at least one of the plurality of functions upon receiving input signifying that the user is a passenger other than the driver.

Embodiments of a vehicle are also disclosed herein. In one such embodiment, the navigation system includes a driver seat, a passenger seat, an occupant detection sensor and a navigation system. The occupant detection sensor is configured to generate a signal indicative of the presence of an occupant in the passenger seat. The navigation system includes a user interface and a controller. The user interface is configured to receive input from and output information to a user. The controller is configured to perform a plurality of functions based on the user input. The controller is further configured to disable performance of at least one of the plurality of functions based on a vehicle condition and provide a warning to the user indicating that performance of the at least one of the plurality of functions is to be performed by a passenger other than the driver. The controller enables performance of the plurality of functions if the signal is indicative of the presence of the passenger in the passenger seat, and the controller receives input signifying that the user is a passenger other than the driver.

Additionally, embodiments of a method of controlling a navigation device in a vehicle are disclosed herein. The method includes detecting a vehicle condition and selectively enabling and disabling at least one of a plurality of functions of the navigation device based on the vehicle condition. The method also includes providing a warning to the user. The warning indicates that performance of the at least one of the plurality of functions is to be performed by a passenger other than a driver. Further, the method includes enabling use of the at least one of the plurality of functions in response to receiving input signifying that the user is a passenger other than the driver.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
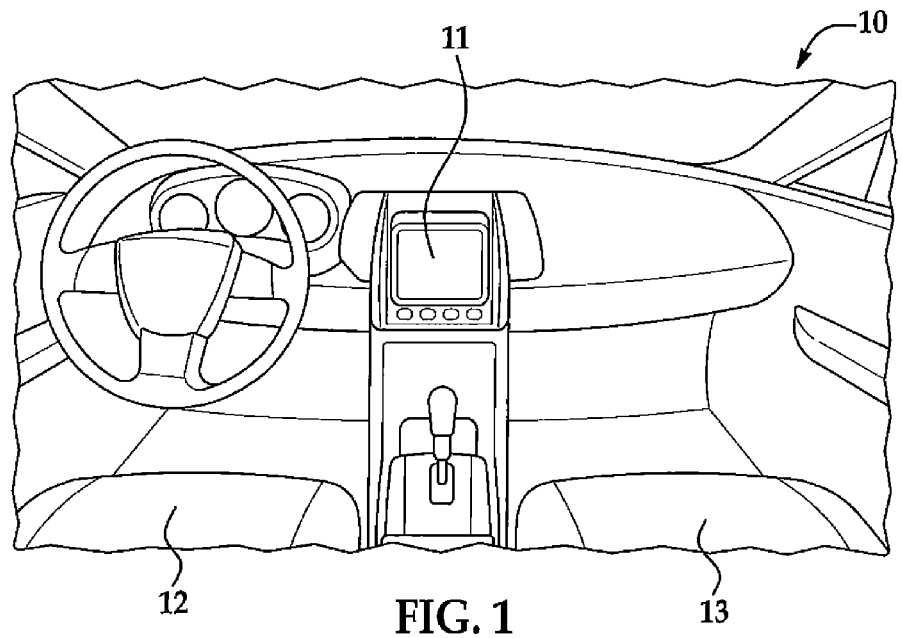
FIG. 1 is a partial perspective view of a vehicle interior having a navigation system according to one embodiment of the present invention

Referring to FIG. 1, a vehicle 10 is illustrated having a navigation system 11 according to one embodiment of the present invention. The vehicle 10 generally includes a driver seat 12 for accommodating a driver and one or more passenger seats 13 for accommodating one or more passengers. As used herein, a passenger seat is any seat other than the seat which the driver of the vehicle occupies. Likewise, a passenger is any other occupant other than the driver of the vehicle. Thus, a passenger not only includes an occupant sitting in a front row passenger seat, but also occupants in any passenger seats of additional rows (not shown) in the vehicle 10. Of course, the structure and type of the vehicle shown is merely exemplary and other suitable vehicles can incorporate the navigation system 11 as described hereinafter.

Figure 2:
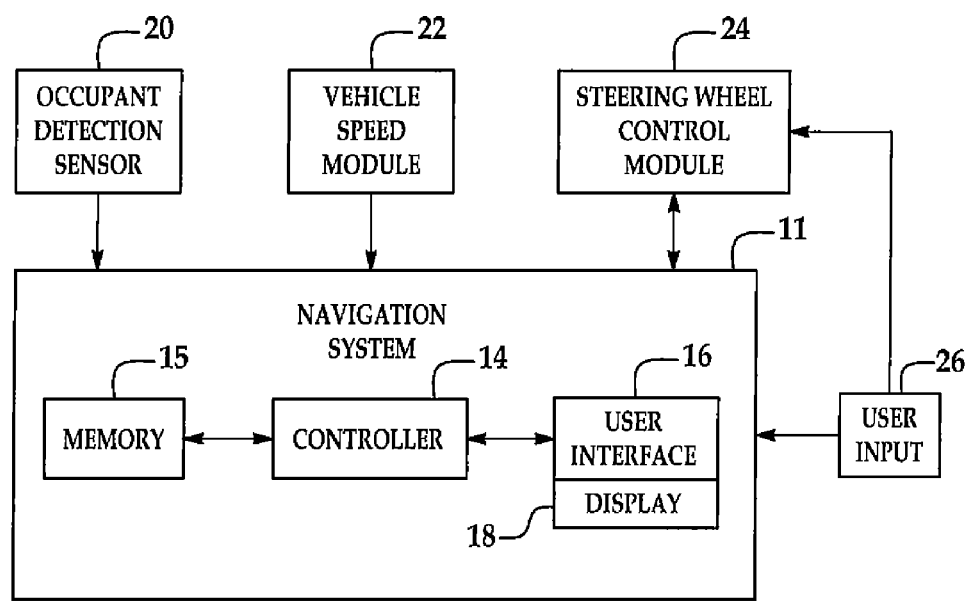
FIG. 2 is block diagram of the navigation system of FIG. 1.

Referring to FIG. 2, the navigation system 11 generally includes a controller 14, a memory 15 and a user interface 16 with a display 18. The controller 14 of navigation system 11 can receive, for example, the global positioning signals from GPS satellites (not shown), data related to the environment of vehicle 10 and user input 26 through user interface 16. Data related to the environment of the vehicle 10 can be retrieved from, for example, a map database stored in memory 15. With this data and/or information, for example, controller 14 can calculate the geographic position of the vehicle 10 and can provide such information on an electronic map along with route instructions. Of course, certain processing functions can be allocated and performed by more than one controller as desired or required. For example, in addition to the processing functions described herein, controller 14 can also calculate the best route based on shortest distance or shortest travel time. Navigation system 11 can provide the output, such as the electronic map display and/or route directions, to occupants of the vehicle through the display 18. Of course, the navigation system 11 can include other components, such as a microphone or speakers or can be coupled with other vehicle systems such as an engine or braking system.

Navigation system 11 may or may not be integrated within vehicle 10. For example, in one embodiment, a navigation system may be a portable navigation device that can be removably mounted in the vehicle. In another embodiment, for example, a navigation system may be a portable navigation device that can wirelessly communicate with the vehicle 10 when brought within a predetermined distance thereof. Although the portable navigation device may have its own screen display, output from the portable navigation device may be shown on a separate on-board vehicle display with a separate user interface. Accordingly, the user may interact with the portable navigation device through the on-board vehicle display and user interface. However, in other embodiments, a user can interact directly with the portable navigation device rather than using the on-board vehicle display and user interface. Further, the portable navigation device, similar to an integrated navigation device, can interact with any other part of the vehicle 10. For example, the portable navigation device can communicate with the vehicle sound system to provide audible route directions to the driver. Of course, other suitable navigation systems and/or devices are available.

Navigation system 11 can also receive input from an occupant detection sensor 20 and vehicle speed 22. Specifically, occupant detection sensor 20 can include one or more sensors or other devices for detecting the presence of an occupant of the vehicle, such as a passenger. Occupant detection sensor 20 can determine the presence (or absence) of an occupant using any suitable manner such as using a seatbelt sensor, a fluid bladder, facial recognition, an infrared sensor or any combination thereof or any other occupant detecting mechanism. This information, as will be discussed in more detail below can be used to determine when to cancel the lockout of certain functions of the navigation system 11.

As discussed previously, the navigation system 11 receives user input 26 through user interface 16. User interface 16 may be a liquid crystal display (LCD) touch screen device. In this embodiment, the user can enter user input 26 in one manner through the touch screen device. However, in other embodiments, the user can enter user input through a keypad, keyboard, pointing device, track ball, graphical pad, a voice recognition interface and/or a combination thereof in lieu of or in addition to the touch screen. Other suitable ways of entering user input are also available.

Referring to FIGS. 4-7, display 18 can include the same or different function buttons 80 on each user interface screen 82, 84, 86 and 88. Function buttons 80 can be used by the user to input information into navigation system 11 to, for example, choose a destination by entering a street address, an intersection, pre-programmed information such as an address, or selecting a location from a map selection, change the screen display to receive additional or alternate information from the navigation system 11 and/or deleting pre-programmed address, Of course, navigation systems can include other suitable functions in addition to or in lieu of these functions.

The configuration of each user interface screen (i.e. what information and function buttons 80 are shown) may be dependent on a determination of the controller 14 and/or based on input from the user. Further, not all of the functions are necessarily enabled. As will be discussed in more detail below, dependent on a vehicle condition, some and/or all of the function buttons 80 can be disabled or "locked out" (shown using a dashed border in FIG. 4). For example, in certain instances, a user may be restricted from entering a destination entry. However, under those same conditions, a user may not be locked out, for example, from exiting a menu screen (e.g. using a "BACK" function button) Of course, the configuration of function buttons 80 is merely exemplary and may be changed as desired or required.

The navigation system 11 can have some and/or all of its function buttons 80 disabled based on a vehicle condition. In effect, disabling a function button can disable use of that particular function of navigation system 11. As used herein, disabling or enabling use of function button 80 may be used interchangeably when describing disabling or enabling use of a function. The vehicle condition used to disable one or more function buttons 80 can, in one embodiment, be based on vehicle speed received from a vehicle speed module 22. Thus, for example, some and/or all functions may be disabled when controller 14 receives information from vehicle speed module 22 that the vehicle is traveling greater than 5 MPH. Of course, 5 MPH is merely an exemplary vehicle threshold speed and other suitable vehicle threshold speeds may be used as desired or required. Moreover, the "locked out" functions include not only those associated with user input 26 directly on the display 18 (i.e. touch screen) but also additional functions such as those on a steering wheel input device (e.g. control pushbutton or joystick).

Accordingly, a user can enter user input 26 through the steering wheel input device (not shown) that communicates with a steering wheel control module 24. Input entered through the steering wheel control module 24 can be used in addition to user interface 16 to control navigation system 11. For example, a user may operate a menu system (or perform another function) of navigation system 11 using a joystick located on the steering wheel. Furthermore, similar to disabling function buttons 80 as described above, navigation system 11 can, for example, send a signal to steering wheel control module 24 to disable the steering wheel input device based on a certain vehicle condition (e.g. the car traveling in excess of 5 MPH). Of course, in other embodiments a vehicle may have other input devices in addition to or in lieu of user interface 16 or steering wheel input devices.

These features can be enabled, as will be discussed in more detail below, when the navigation system receives input signifying that the user is a passenger other than the driver. Accordingly, rather than restricting functions based solely on when the vehicle is in motion or some other vehicle condition, as discussed previously, a passenger may be permitted to use functions of the navigation system 11 regardless of the vehicle condition (e.g. whether the vehicle is in motion).

Figure 3:
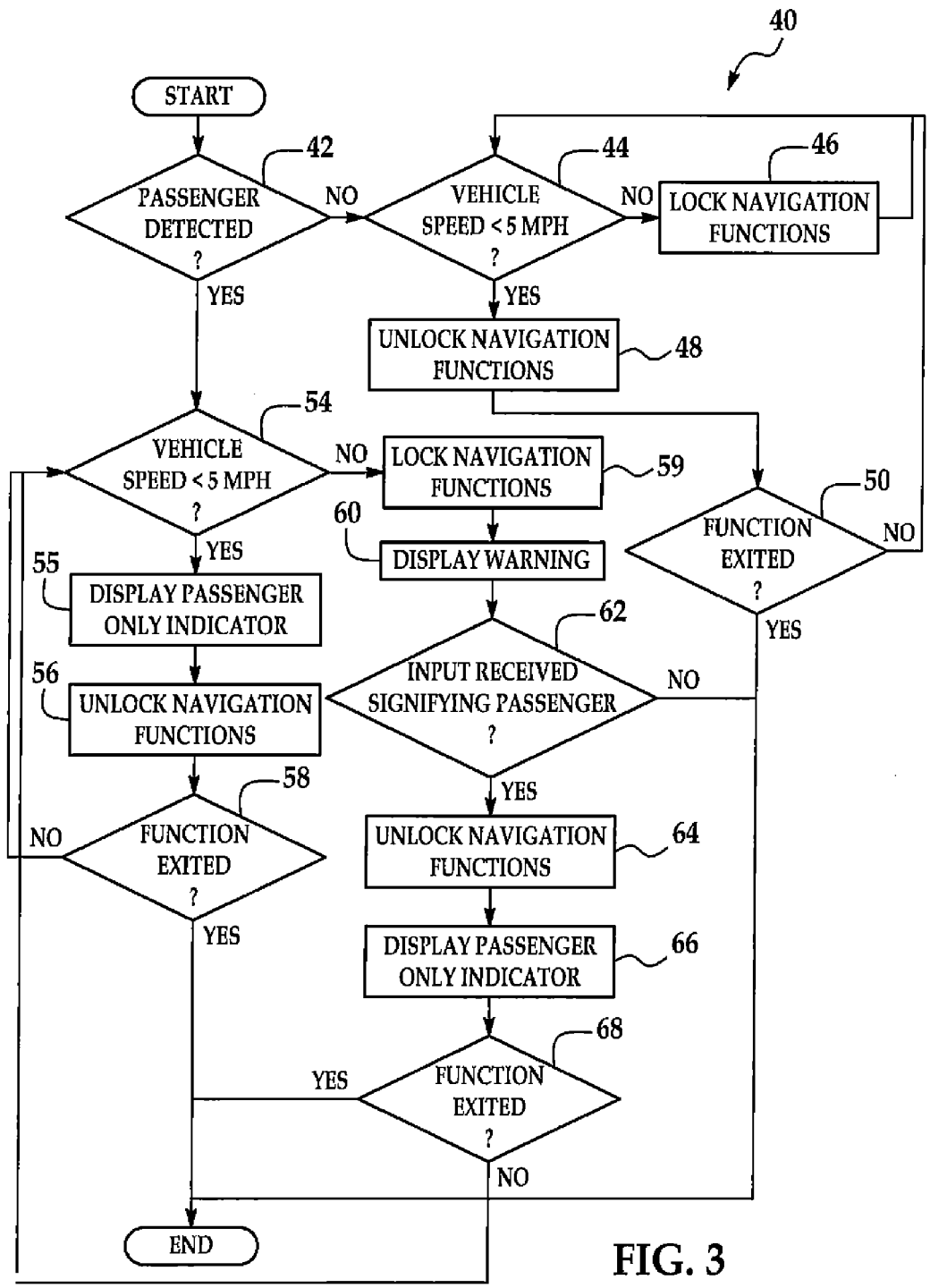
FIG. 3 is a flow diagram of a routine performed by the navigation system of FIG. 1.
Figure 4:
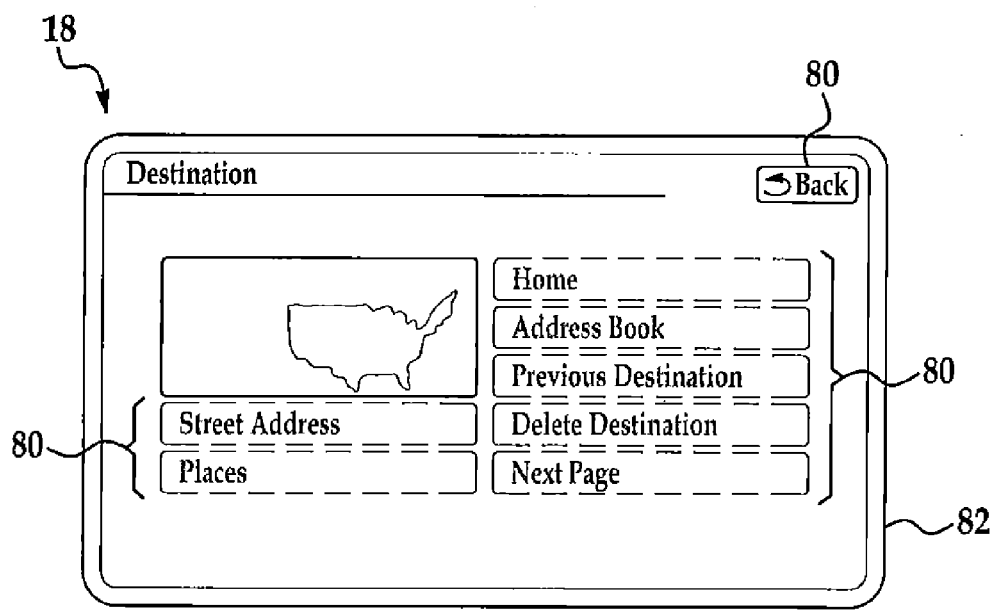
FIGS. 4-7 are user interface screens displayed by the navigation system of FIG. 1.
Figure 5:
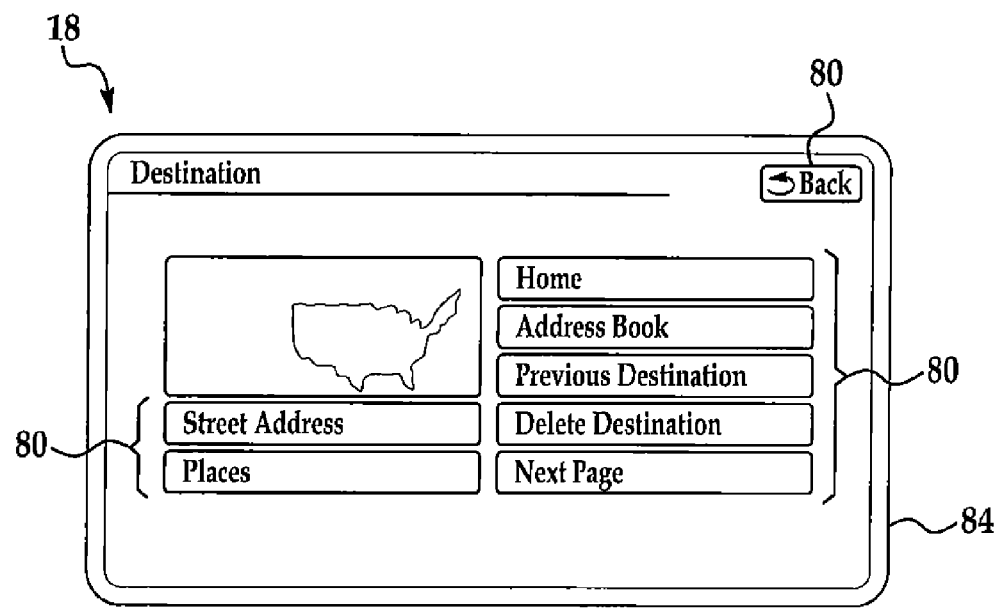

Referring to FIG. 3, the controller 14 can perform a routine 40 to determine whether the function of the navigation system should be enabled (or unlocked) or disabled (or locked). At decision block 42, the controller 14 determines whether there is a passenger detected. The controller 14 can receive the information from the occupant detection sensor 20, can make the determination itself or can receive the information from another source. If the controller 14 determines that a passenger has not been detected, the controller 14 determines whether the vehicle speed is greater than a predetermined threshold such as 5 MPH at decision block 44. If the controller 14 determines that the vehicle speed is greater than 5 MPH, all or some navigation functions can be locked at block 46. In this manner, the driver will be unable to access certain functions of the navigation system while the vehicle is in motion above the predetermined threshold. Accordingly, the user interface screen 82 of FIG. 4 can be displayed, which illustrates how functions 80 are disabled. As illustrated, every function button except the "BACK" button has been disabled on user interface screen 82. Of course, in other embodiments, the way that the devices used to enter user input 26 are disabled may be dependent on the device itself and may not include disabling selection of a function button 80. For example, in some embodiments, an input device may be disabled mechanically or electrically rather than in response to a determination by the controller 14. After the navigation functions have been locked, the controller 14 can continually determine whether the navigation functions should continue to be locked by determining the whether the vehicle speed remains greater than 5 MPH (decision block 44).

If the controller 14 determines, at decision block 44, that the vehicle speed is not greater than 5 MPH, the navigation functions can be unlocked at block 48. Accordingly, the user interface screen 84 of FIG. 5 can be displayed, which illustrates how functions 80 are enabled. As illustrated, every function button is enabled on user interface screen 82. While the driver is utilizing the unlocked navigation functions, the controller 14 can determine whether the function has been exited at decision block 50. If the function has not been exited, the controller 14 can continually determine whether the navigation functions should remain unlocked by determining whether the vehicle speed is not greater than 5 MPH (decision block 44). Otherwise, if the function is exited, the controller 14 can end the routine.

If the controller 14 determines that a passenger has been detected at decision block 42, the controller 14 determines whether the vehicle speed is greater than the predetermined threshold (e.g. 5 MPH) at decision block 54. If the controller 14 determines that the vehicle speed is not greater than 5 MPH, the controller 14 can then display a passenger only indicator at block 55. The passenger only indicator, as will be discussed in more detail below with reference to FIG. 6 and block 66, can provide a notice that functions 80 are to be used only by the passenger. Although a driver may be permitted to use the functions 80 when traveling less than 5 MPH (block 56), displaying a passenger only indicator at block 55 can prevent intermittent flashing during, for example, stop-and-go traffic when a passenger has been detected and the vehicle is traveling less than 5 MPH. In some embodiments, however, the controller 14 may not display the indicator at block 55 when, for example, the navigation functions can be used by the driver.

After the passenger only indicator has been displayed, the navigation functions can be unlocked at block 56. Accordingly, similar to when there is no passenger present and the driver is travelling less than 5 MPH as described above, the user interface screen 82 of FIG. 5 can be displayed with all the functions 80 enabled. While the passenger or driver is utilizing the unlocked navigation functions, the controller 14 can determine whether the function has been exited at decision block 58. If the function has not been exited, the controller 14 can continually determine whether the navigation functions should remain unlocked by determining whether the vehicle speed is not greater than 5 MPH (decision block 54). Otherwise, if the function is exited, the controller 14 can end the routine.

Figure 6:
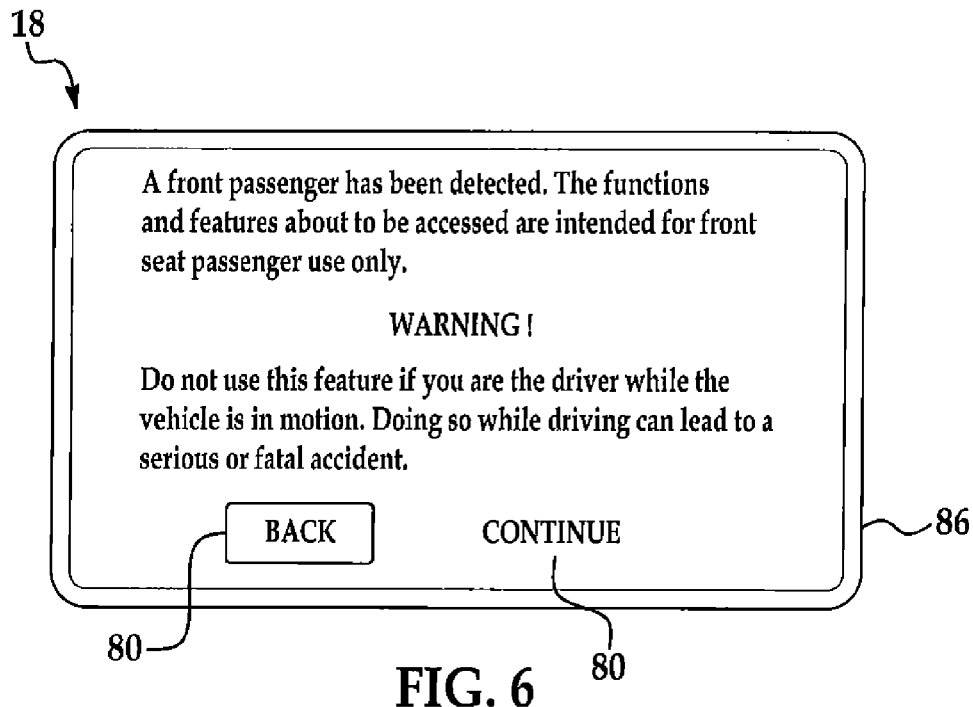
Figure 7:
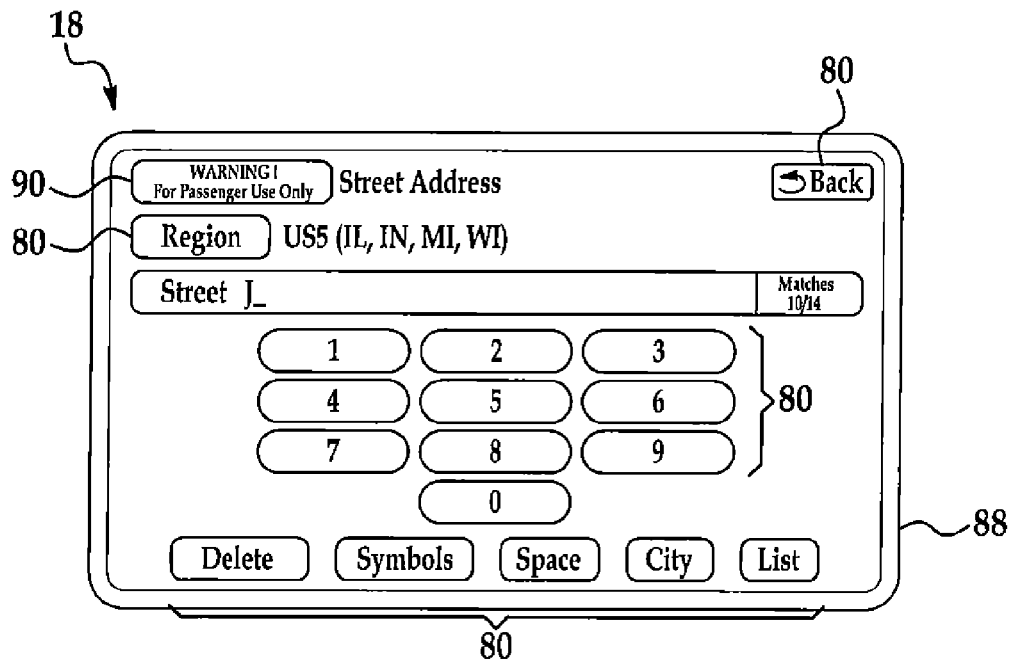

If the controller 14 determines that the vehicle speed is greater than 5 MPH, the navigation functions can be locked at block 59. After the navigation functions have been locked at block 59, a warning can be displayed to the driver and passenger at block 60 indicating that performance of the plurality of functions is to be performed only by a passenger. For example, as shown in FIG. 6, the user interface screen 86 can present a warning indicating that, for example, a front passenger has been detected and that the functions and features to be used are intended only for use by a front passenger. Further, the navigation system 11 can communicate to, for example, the steering wheel control module 24 so that the driver can only select the "BACK" button on user interface screen 86. In other words, regardless of the operation of the steering wheel input device (e.g. joystick), the driver will not be able to select other function 80 other than the "BACK" button. After displaying the warning at block 60, the controller determines whether input has been received signifying that the user is a passenger (i.e. not the driver) of the vehicle at decision block 62. For example, as shown in FIG. 6, the user can select the function button "CONTINUE" to signify that the user is a passenger. If no input has been received signifying that the user is a passenger or if, for example the function button "BACK" is selected, the controller 14 can end the routine. In other embodiments, the user can signify that the user is a passenger by pushing a button out of the driver's reach, voice recognition of the user, fingerprint recognition, facial recognition or any other suitable manner.

Otherwise, if input has been received signifying that the user is a passenger (e.g. selecting "CONTINUE" function button, the navigation functions can be unlocked at block 64. The controller 14 can then display a passenger only indicator at block 66. This may be displayed once or continually on the user interface screen. For example, as shown in FIG. 6 a warning message 90 is displayed continually while the passenger is using the unlocked navigation functions. Alternatively, in other embodiments, the warning is not necessarily visual and can be audible, tactile or provided in any other suitable manner. While the passenger is utilizing the unlocked navigation functions, the controller 14 can determine whether the function has been exited at decision block 68. If the function has not been exited, the controller 14 can continually determine whether the navigation functions should remain unlocked by determining whether the vehicle speed is not greater than 5 MPH (decision block 54). Otherwise, if the function is exited, the controller 14 can end the routine.

Although this embodiment has been described using vehicle speed, other vehicle conditions can be used in lieu of vehicle speed to make the lockout determinations described above. For example, the determinations can be made based on acceleration, transmission position or any other suitable vehicle condition. In other embodiments, the lockout determinations can be made dependent on more than one vehicle conditions. For example, when the driver is the sole occupant in the vehicle, the navigations functions can be locked out if the driver is traveling at a low speed and for example, is accelerating at a rate greater than a second predetermined acceleration threshold value. Further, in other embodiments, the second (or additional) predetermined threshold values may be employed where useful features are enabled at low speeds, but disabled at higher speeds. Of course, the predetermined threshold values and the selected user interface features to be locked out may be varied as desired or required.

Further, although the above-described routine relies on detection of a passenger, embodiments of the present invention may be implemented without occupant detection. Accordingly, the lockout determinations can be based solely on whether input has been received signifying that the user is a passenger (e.g. decision block 62).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A navigation system for a vehicle, comprising:
a user interface having a primary input device configured to receive input from a user and a display device configured to output information to the user;
an additional user input device including at least one steering wheel input device configured to receive input from a driver of the vehicle; and
a controller configured to perform a plurality of functions in response to the input from one or both of the user interface and the additional user input device and to provide information for display at the display device of the user interface, the controller further configured to disable performance of at least one of the plurality of functions based on a vehicle condition and output, for display, a first warning message to the user which spans substantially the entirety of the display device to obstruct access to a user interface screen, indicates that performance of the plurality of functions is to be performed by a passenger other than the driver, and requests for an identifying input from the user to signify the user is a passenger other than the driver;
wherein the controller enables performance of the at least one of the plurality of functions in response to receiving the identifying input from the user interface signifying that the user is a passenger other than the driver while disabling the additional user input device and outputs, for display, a second warning message which spans a first portion of the display device with a user interface screen positioned on a second portion of the display device that is unobstructed from the second warning message.

2. The navigation system of claim 1, further comprising: an occupant detection sensor configured to generate a signal indicative of the presence of an occupant in a passenger seat, wherein the controller enables performance of the at least one of the plurality of functions in response to receiving the identifying input from the user interface while continuing to disable the additional user input device if the signal is indicative of the presence of the passenger in the passenger seat and the identifying input signifies that the user is a passenger other than the driver regardless of the vehicle condition.

3. The navigation system of claim 2, wherein the passenger seat is a front passenger seat.

4. The navigation system of claim 1, wherein the vehicle condition is at least one of vehicle speed and transmission position.

5. The navigation system of claim 1, wherein the controller disables performance of the plurality of functions if the identifying input signifying that the user is a passenger other than the driver is not received.

6. A vehicle, comprising:
a driver seat;
a passenger seat;
an occupant detection sensor configured to generate a signal indicative of the presence of an occupant in the passenger seat; and
a navigation system including a user interface having a primary input device configured to receive input from a user and a display device configured to output information to the user, an additional user input device including at least one steering wheel input device configured to receive input from a driver of the vehicle, a controller configured to perform a plurality of functions in response to the input from the primary input device or the additional user input device, the controller further configured to disable performance of at least one of the plurality of functions based on a vehicle condition and output, for display, a first warning message to the user which spans substantially the entirety of the display device to obstruct access to a user interface screen, indicates that performance of the at least one of the plurality of functions is to be performed by a passenger other than the driver, and requests for an identifying input from the user to indicate that the user is a passenger other than the driver;
wherein the controller allows performance of the at least one of the plurality of functions if the signal is indicative of the presence of the passenger in the passenger seat in response to receiving the identifying input from the user interface signifying that the user is a passenger other than the driver while disabling the additional user input device and outputs, for display, a second warning message which spans a first portion of the display device with a user interface screen positioned on a second portion of the display device that is unobstructed from the second warning message.

7. The vehicle of claim 6, wherein the vehicle condition is at least one of vehicle speed and transmission position.

8. A method of controlling a navigation device in a vehicle, comprising:
detecting a vehicle condition;
selectively enabling and disabling at least one of a plurality of functions of the navigation device based on the vehicle condition;
displaying a first warning to a user, the first warning spanning substantially the entirety of a display device to obstruct access to a user interface screen, indicating that performance of the at least one of the plurality of functions is to be performed by a passenger other than a driver, and requesting an identifying input signifying that the user is a passenger other than the driver; and
enabling use of the at least one of the plurality of functions in response to receiving the identifying input from a user interface having a primary input device configured to receive input from the user, the identifying input signifying that the user is a passenger other than the driver while disabling an additional user input device including at least one steering wheel input device and configured to receive input from the driver of the vehicle and displaying a second warning message which spans a first portion of the display device simultaneously with a user interface screen across a second portion of the display device that is unobstructed from the second warning message.

9. The method of claim 8, further comprising:
detecting the presence of the passenger; and
enabling use of the at least one of the plurality of functions in response to the presence of the passenger and receiving the identifying input signifying that the user is a passenger other than the driver regardless of the vehicle condition while continuing to disable the additional user input device.

10. The method of claim 8, wherein the vehicle condition is at least one of vehicle speed and transmission position.

11. The method of claim 8, further comprising:
disabling use of the at least one of the plurality of functions if the identifying input signifying that the user is a passenger other than the driver is not received.

* * * * *